(12) United States Patent
Revow et al.

(10) Patent No.: US 7,702,145 B2
(45) Date of Patent: Apr. 20, 2010

(54) ADAPTING A NEURAL NETWORK FOR INDIVIDUAL STYLE

(75) Inventors: Michael Revow, Bellevue, WA (US); Manish Goyal, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 966 days.

(21) Appl. No.: 11/477,332

(22) Filed: Jun. 28, 2006

(65) Prior Publication Data
US 2008/0002886 A1 Jan. 3, 2008

(51) Int. Cl.
*G06K 9/62* (2006.01)
(52) U.S. Cl. .................. 382/156; 382/159; 382/179; 382/186; 382/187
(58) Field of Classification Search .......... 382/155, 382/156, 159, 161, 179, 186, 187, 189
See application file for complete search history.

(56) References Cited

U.S. PATENT DOCUMENTS

| | | | | |
|---|---|---|---|---|
| 5,544,260 A | * | 8/1996 | Chefalas et al. | 382/187 |
| 5,588,073 A | * | 12/1996 | Lee et al. | 382/187 |
| 5,812,698 A | * | 9/1998 | Platt et al. | 382/186 |
| 6,028,956 A | * | 2/2000 | Shustorovich et al. | 382/156 |
| 6,567,548 B2 | * | 5/2003 | Nathan et al. | 382/186 |
| 2003/0002731 A1 | * | 1/2003 | Wersing et al. | 382/161 |
| 2003/0123732 A1 | * | 7/2003 | Miyazaki et al. | 382/186 |
| 2006/0193518 A1 | * | 8/2006 | Dong | 382/186 |
| 2008/0002886 A1 | * | 1/2008 | Revow et al. | 382/187 |

* cited by examiner

*Primary Examiner*—Gregory M Desire
(74) *Attorney, Agent, or Firm*—Capitol City TechLaw; Richard C. Irving

(57) ABSTRACT

Various technologies and techniques are disclosed for improving handwriting recognition using a neural network by allowing a user to provide samples. A recognition operation is performed on the user's handwritten input, and the user is not satisfied with the recognition result. The user selects an option to train the neural network on one or more characters to improve the recognition results. The user is prompted to specify samples for the certain character, word, or phrase, and the neural network is adjusted for the certain character, word, or phrase. Handwritten input is later received from the user. A recognition operation is performed on the handwritten input using the neural network that was adjusted for the certain character or characters.

19 Claims, 12 Drawing Sheets

ADAPTING A NEURAL NETWORK FOR INDIVIDUAL STYLE

BACKGROUND

It is widely accepted that a good approach to building handwriting recognition devices such as Tablet PCs or Pocket PCs is to employ a machine learning model such as a neural network. Achieving good "walkup accuracy" for the large variety of writing styles requires the collection of handwriting samples from many individuals with a large variety handwriting styles. The samples in turn are used to train a handwriting recognizer. Such a recognizer will perform well for popular styles, but less well for less common or unusual handwriting styles.

SUMMARY

Various technologies and techniques are disclosed for improving handwriting recognition in a neural network by allowing a user to provide samples. A recognition operation is performed on the user's handwritten input, and the user is not satisfied with the recognition result. The user selects an option to train the neural network on one or more characters, words or phrases to improve the recognition results. The user is prompted to specify samples for the certain character or words, and the neural network is adjusted for the certain character or characters. In one implementation, the decision boundaries of the neural network for the certain character or characters are adjusted based on the user-supplied samples. Handwritten input is later received from the user. A recognition operation is performed on the handwritten input using the neural network that was adjusted for the certain character or characters. The results of the recognition operation are displayed to the user on a display device.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
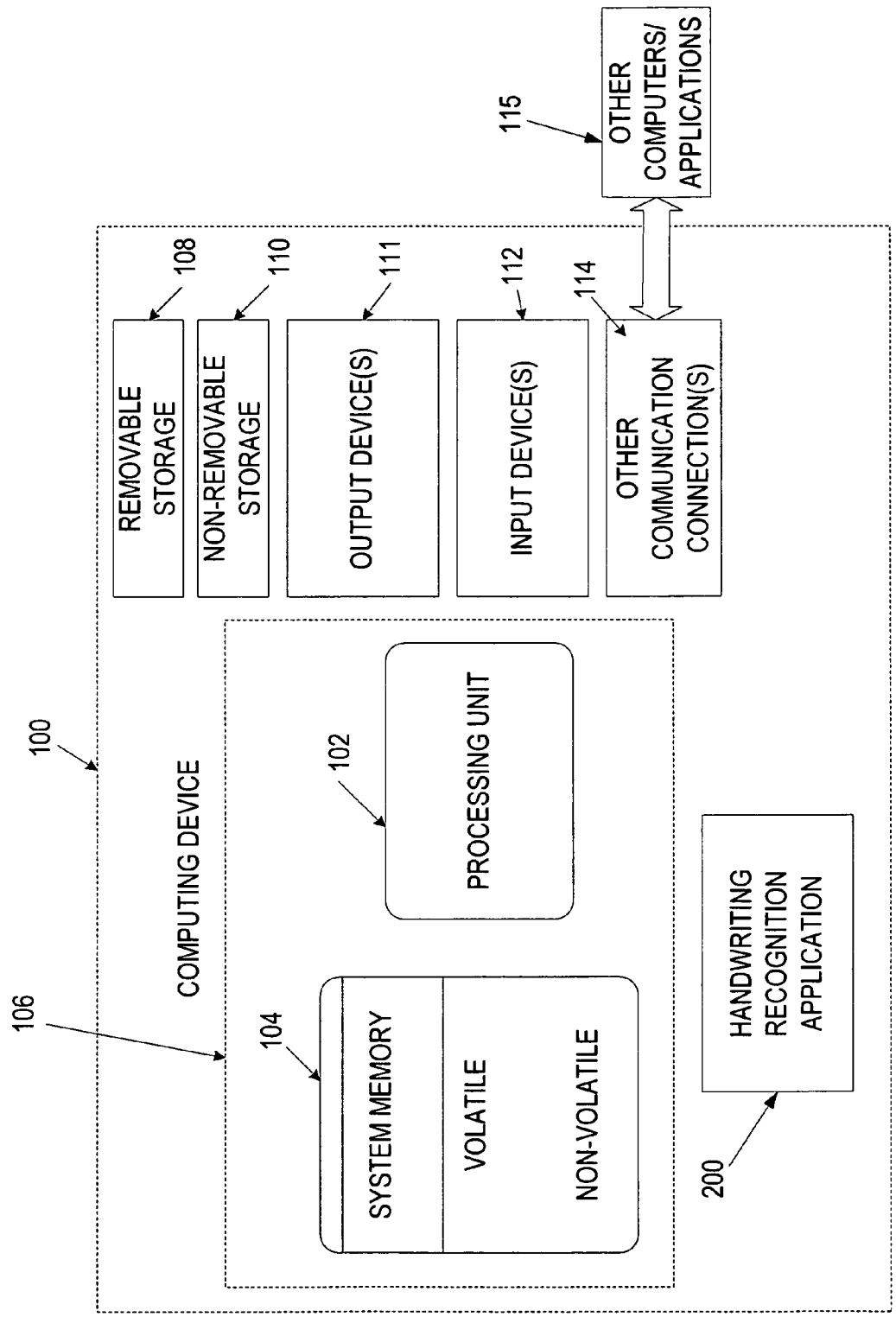
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that performs handwriting recognition, but the system also serves other purposes in addition to these. In one implementation, one or more of the techniques described herein can be implemented as features within a handwriting recognition program, or from any other type of program or service that allows a user to input handwritten input. In one implementation, the system allows the user to supply user specific samples for certain characters for which the user is not satisfied with the recognition results to improve future recognitions for the user-supplied character(s). In another implementation, the user can be prompted to supply samples of handwriting with a list of predefined characters or words.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes handwriting recognition application 200. Handwriting recognition application 200 will be described in further detail in FIG. 2.

Figure 2:
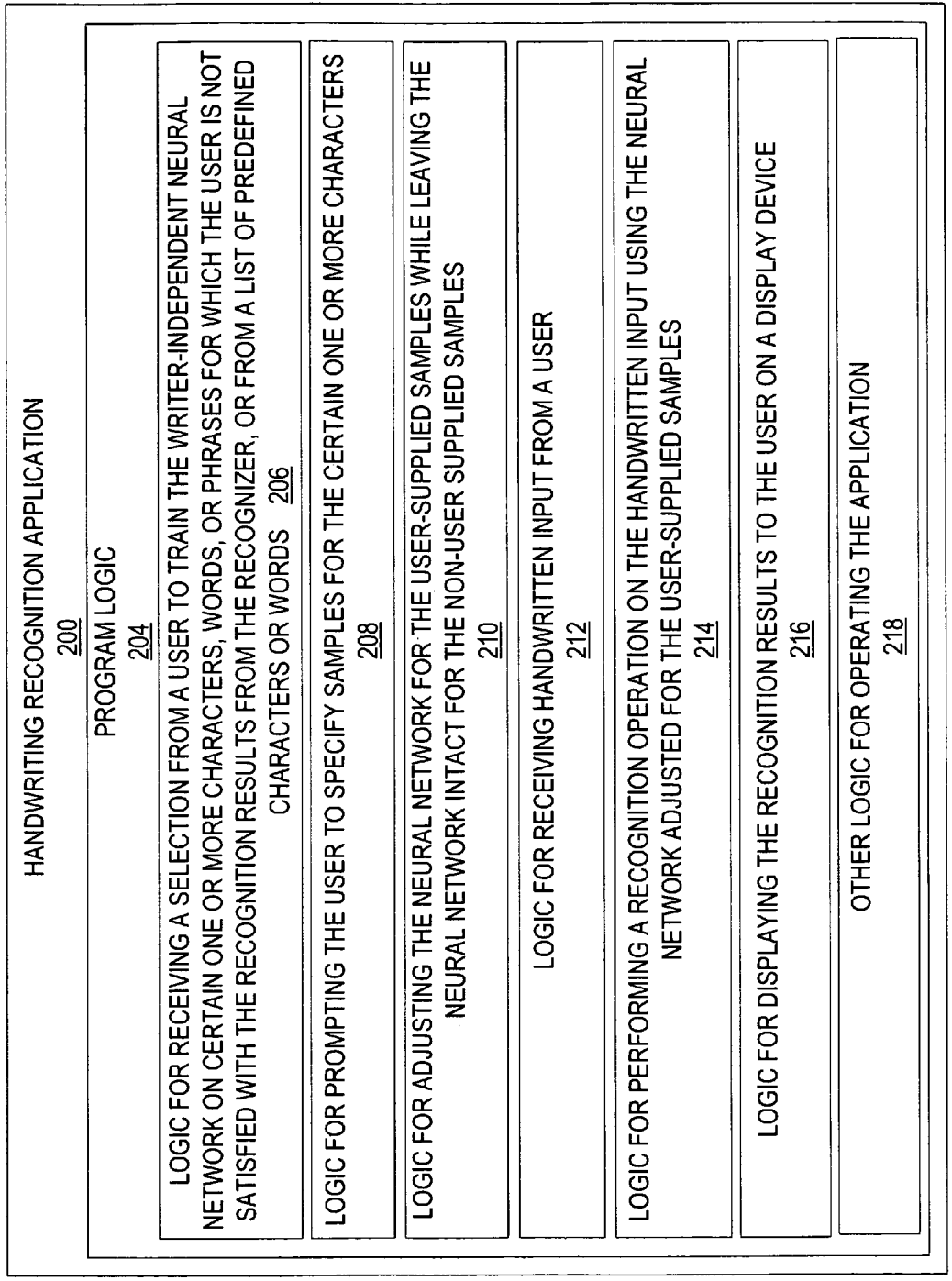
FIG. 2 is a diagrammatic view of a handwriting recognition application of one implementation operating on the computer system of FIG. 1.

Turning now to FIG. 2 with continued reference to FIG. 1, a handwriting recognition application 200 operating on computing device 100 is illustrated. Handwriting recognition application 200 is one of the application programs that reside on computing device 100. However, it will be understood that handwriting recognition application 200 can alternatively or additionally be embodied as computer-executable instructions on one or more computers and/or in different variations than shown on FIG. 1. Alternatively or additionally, one or more parts of handwriting recognition application 200 can be part of system memory 104, on other computers and/or applications 115, or other such variations as would occur to one in the computer software art.

Handwriting recognition application 200 includes program logic 204, which is responsible for carrying out some or all of the techniques described herein. Program logic 204 includes logic for receiving a selection from a user to train the writer-independent neural network on certain one or more characters, words, or phrases for which the user is not satisfied with the recognition results from the recognizer, or from a list of predefined characters or words 206; logic for prompting the user to specify samples for the certain one or more characters 208; logic for adjusting the neural network for the user-supplied samples while leaving the neural network intact for the non-user supplied samples 210; logic for receiving handwritten input from a user 212; logic for performing a recognition operation on the handwritten input using the neural network adjusted for the user-supplied samples 214; logic for displaying the recognition results to the user on a display device 216; and other logic for operating the application 218. In one implementation, program logic 204 is operable to be called programmatically from another program, such as using a single call to a procedure in program logic 204.

Turning now to FIGS. 3-7 with continued reference to FIGS. 1-2, the stages for implementing one or more implementations of handwriting recognition application 200 are described in further detail.

Figure 3:
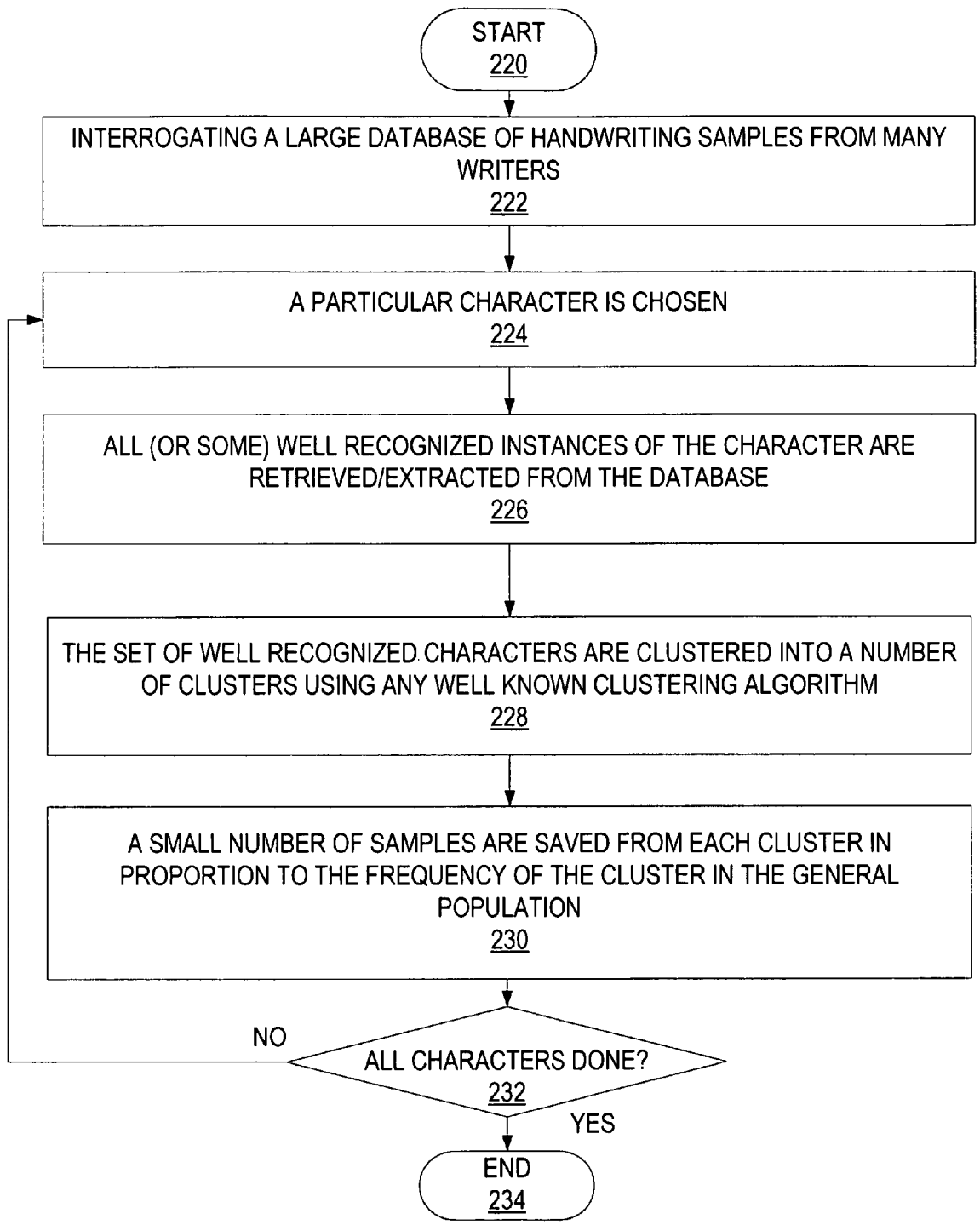
FIG. 3 is a process flow diagram for one implementation illustrating the stages involved in choosing representative samples of handwriting from a large pool of writer independent samples.

FIG. 3 is a process flow diagram for one implementation illustrating the stages involved in choosing representative samples of handwriting from a large pool of writer independent samples. In one form, the process of FIG. 3 is at least partially implemented in the operating logic of computing device 100. In one implementation, this process is performed at the time the handwriting recognizer is built, and the resulting samples are later used in stage 307 on FIG. 7. The process begins at start point 220 with interrogating a large database of handwriting samples from many writers (stage 222). A particular character is chosen (stage 224) and all (or some) well recognized instances of the character are retrieved/extracted from the database (stage 226). In one implementation, a well recognized sample is one that when passed through the trained writer independent classifier is returned correctly with high confidence.

The set of well recognized characters are clustered into a number of clusters using any well known clustering algorithm (stage 228). A small number of samples are saved from each cluster in proportion to the frequency of the cluster in the general population (stage 230). In another implementation, instead of saving the samples themselves, a generative model description of the cluster can be saved. The procedure terminates when all characters have been processed into a saved sample of representative samples (decision point 232) which in turn are bundled with the recognizer. The process ends with end point 234.

Figure 4:
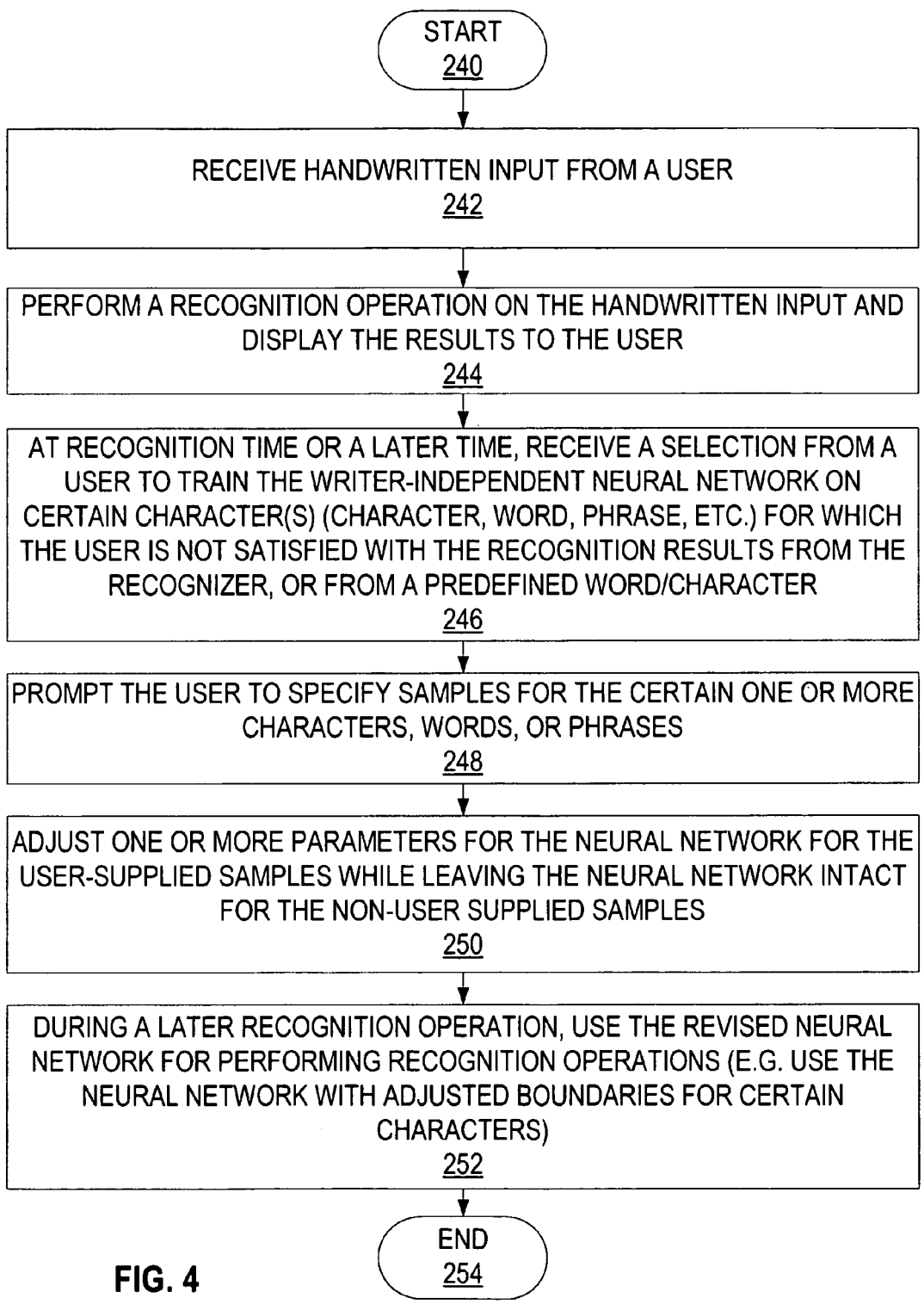
FIG. 4 is a process flow diagram for one implementation of the system of FIG. 1 illustrating the stages involved in allowing a user to provide personal samples to train a writer independent neural network on the user's style.

FIG. 4 is a high level process flow diagram for handwriting recognition application 200 illustrating the stages involved in allowing a user to provide personal samples to train a writer-independent neural network on the user's style. In one form, the process of FIG. 4 is at least partially implemented in the operating logic of computing device 100.

The procedure begins at start point 240 with receiving handwritten input from a user (stage 242). A recognition operation is performed on the handwritten input and the results are displayed to the user (stage 244). At recognition time or a later time, the system receives a selection from a user to train the writer-independent neural network on certain character(s) (e.g. character, word, or phrase) for which the user is not satisfied with the recognition results from the recognizer or from a predefined set of characters, words and phrases (stage 246). The user is prompted to specify samples for the certain one or more characters, words, or phrases (stage 248). One or more parameters of the neural network are adjusted for the user-supplied samples while left intact the non-user supplied samples (stage 250). In one implementation, when the user supplies samples for words, the written ink is first segmented into sub-character segments, and then the neural network is adjusted for each sub-character segment. During a later recognition operation, the revised neural network is used for performing recognition operations (e.g. use the neural network that has adjusted boundaries for certain characters) (stage 252). The process ends at end point 254.

Figure 5:
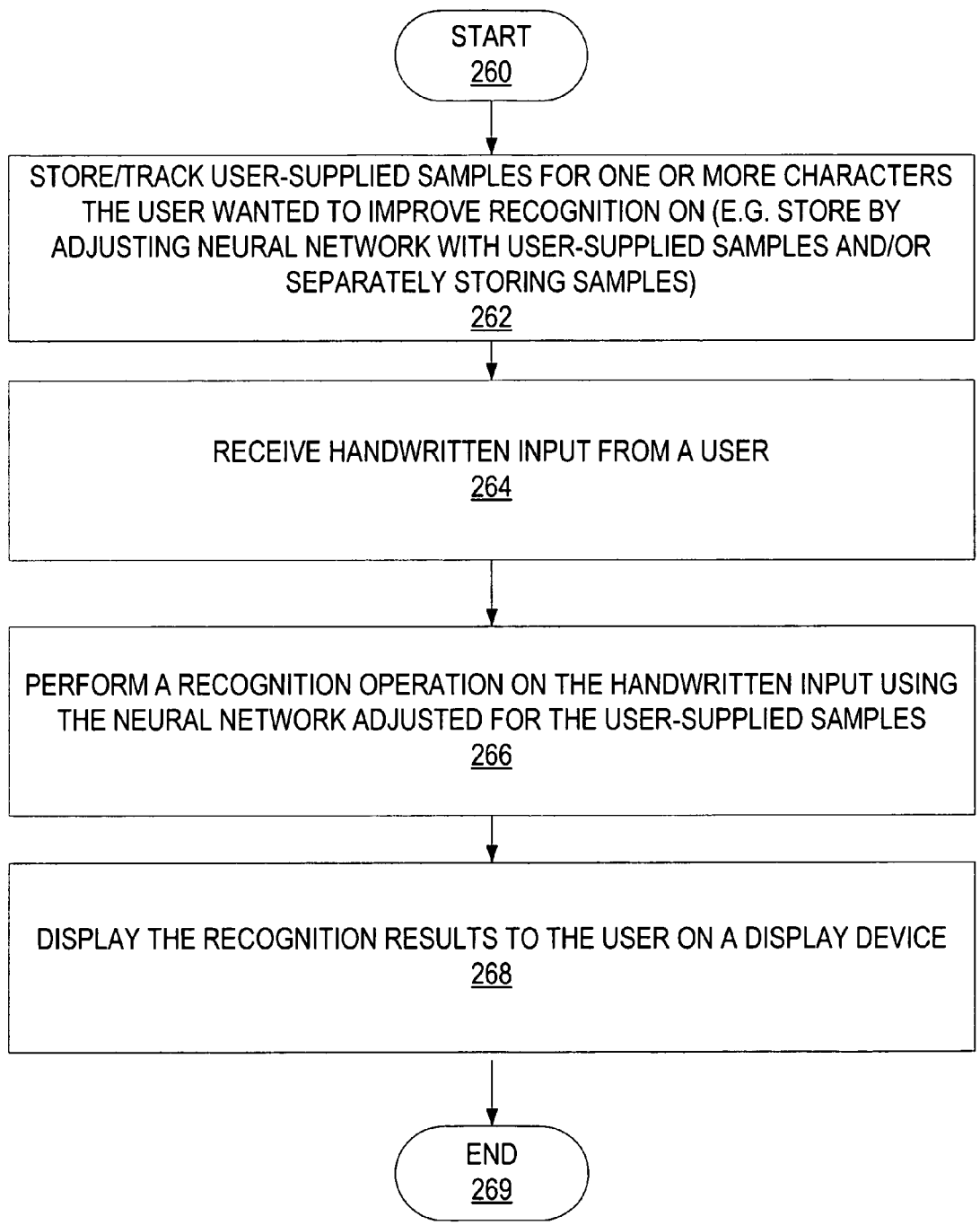
FIG. 5 is a process flow diagram for one implementation of the system of FIG. 1 illustrating the stages involved in performing a handwriting recognition operation using a neural network adjusted according to user-supplied samples.

FIG. 5 illustrates one implementation of the stages involved in performing a handwriting recognition operation using a neural network adjusted according to user-supplied samples. In one form, the process of FIG. 5 is at least partially implemented in the operating logic of computing device 100. The procedure begins at start point 260 with storing/tracking user-supplied samples for one or more characters that the user wanted to improve recognition on (e.g. store by adjusting neural network with user-supplied samples and/or separately storing the samples) (stage 262). Handwritten input is received from a user (stage 264). A recognition operation is performed on the handwritten input using the neural network adjusted for the user-supplied samples (stage 266). The recognition results are displayed to the user on a display device (stage 268). The process ends at end point 269.

Figure 6:
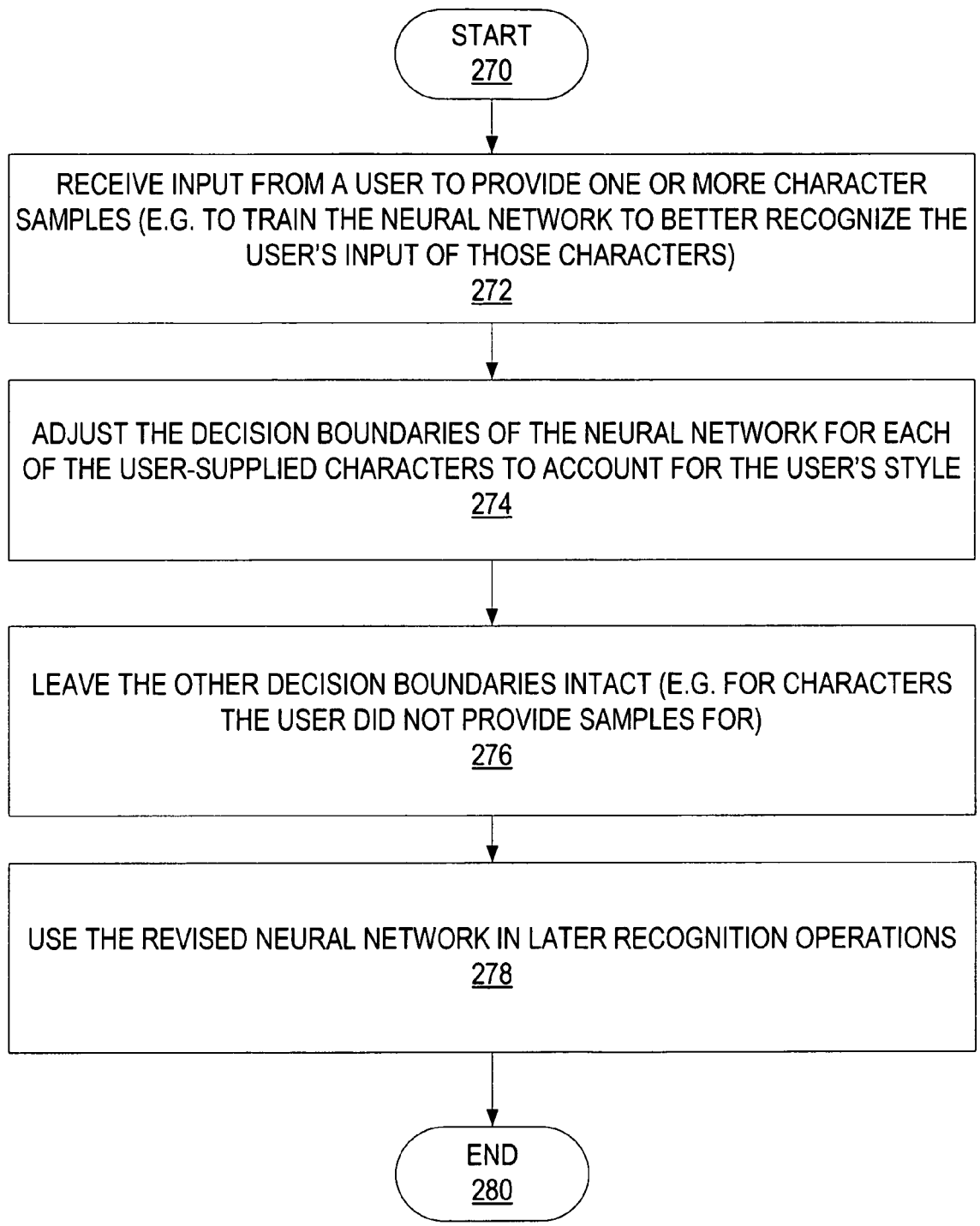
FIG. 6 is a process flow diagram for one implementation of the system of FIG. 1 illustrating the stages involved in adjusting the neural network to a user's style by adjusting the decision boundaries for the character or characters based upon user-supplied samples.

FIG. 6 illustrates one implementation of the stages involved in adjusting the neural network to a user's style by adjusting the boundaries based for a certain character or characters upon receiving user-supplied samples. In one form, the process of FIG. 6 is at least partially implemented in the operating logic of computing device 100. The procedure begins at start point 270 with receiving input from a user to provide one or more character samples (e.g. to train the neural network to better recognize the user's input of those characters) (stage 272). The decision boundaries of the neural network are adjusted for each of the user-supplied characters to account for the user's style (stage 274). The other decision boundaries are left intact (e.g. for characters the user did not provide samples for) (stage 276). The revised neural network is used in later recognition operations (stage 278). The process ends at end point 280.

Figure 7:
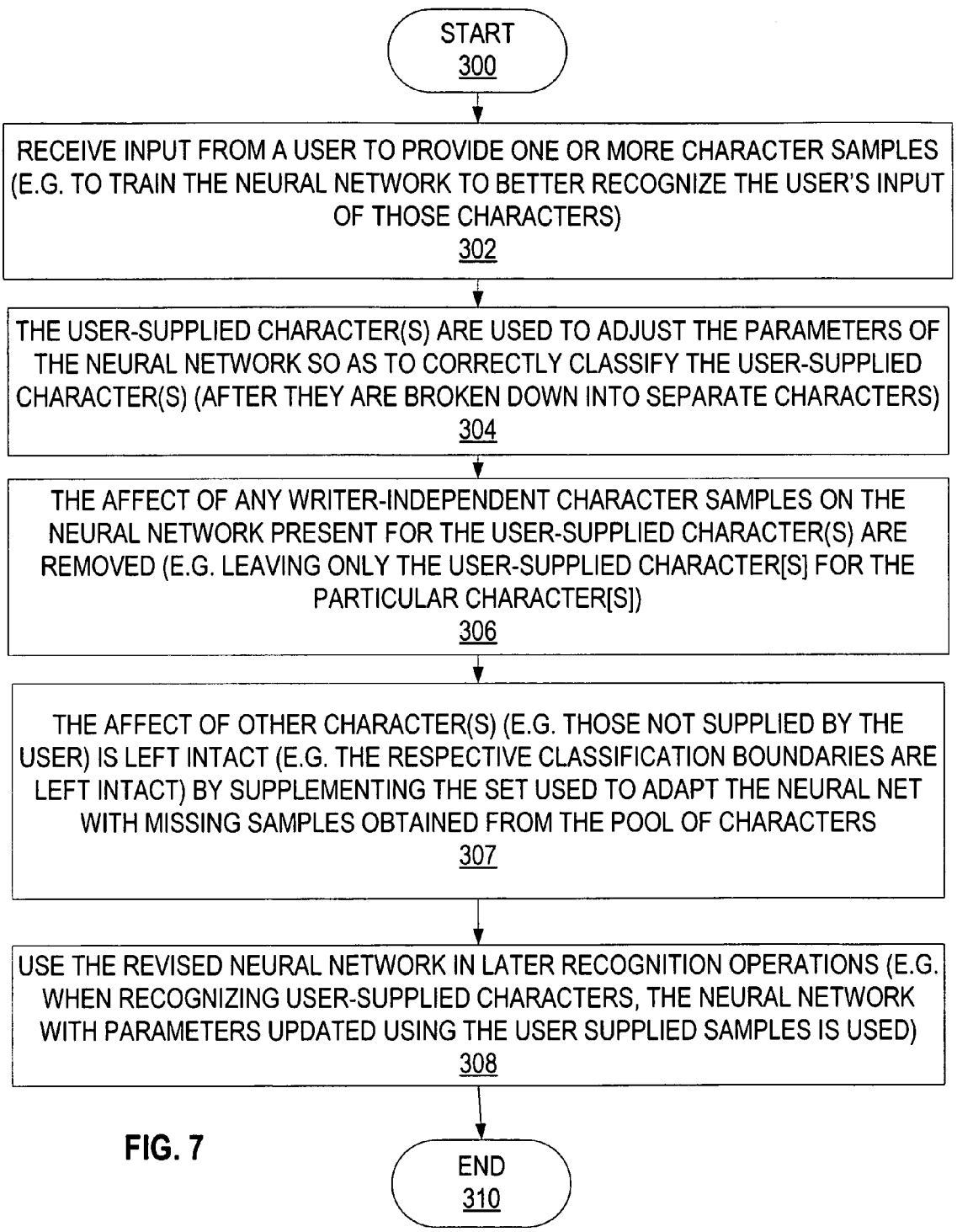
FIG. 7 is a process flow diagram for one implementation of the system of FIG. 1 that illustrates the stages involved in adjusting the neural network to a user's style by keeping only the user-supplied samples for the character or characters.

FIG. 7 illustrates one implementation of the stages involved in adjusting the neural network to a user's style by keeping only the user-supplied samples for the character or characters. In one form, the process of FIG. 7 is at least partially implemented in the operating logic of computing device 100. The procedure begins at start point 300 with receiving input from a user to provide one or more character samples (e.g. to train the neural network to better recognize the user's input of those characters) (stage 302). The user-supplied character(s) are used to adjust the parameters of the neural network so as to correctly classify the user-supplied characters(s). When words are supplied, they are first broken down into separate characters. (stage 304). The affect of any writer-independent character samples on the neural network present for the particular user-supplied character(s) are removed, leaving only the user supplied character(s) for the particular character(s) (stage 306). The affect of other character(s) (e.g. those not supplied by the user) is left intact (e.g. the respective classification boundaries are left intact) by supplementing the set used to adapt the neural net with the missing samples obtained from the pool of characters (as described in the process of FIG. 3) (stage 307). The revised neural network is used in later recognition operations (e.g. when recognizing user-supplied characters, the neural network with parameters updated using the user supplied samples is used) (stage 308). The process ends at end point 310.

Turning now to FIGS. 8-12, two-dimensional diagrams and simulated screens are shown to further illustrate the concepts and stages of FIGS. 3-7. The screens of FIGS. 10-12 can be displayed to users on output device(s) 111. Furthermore, the screens of FIGS. 10-12 can receive input from users from input device(s) 112.

Figure 8:
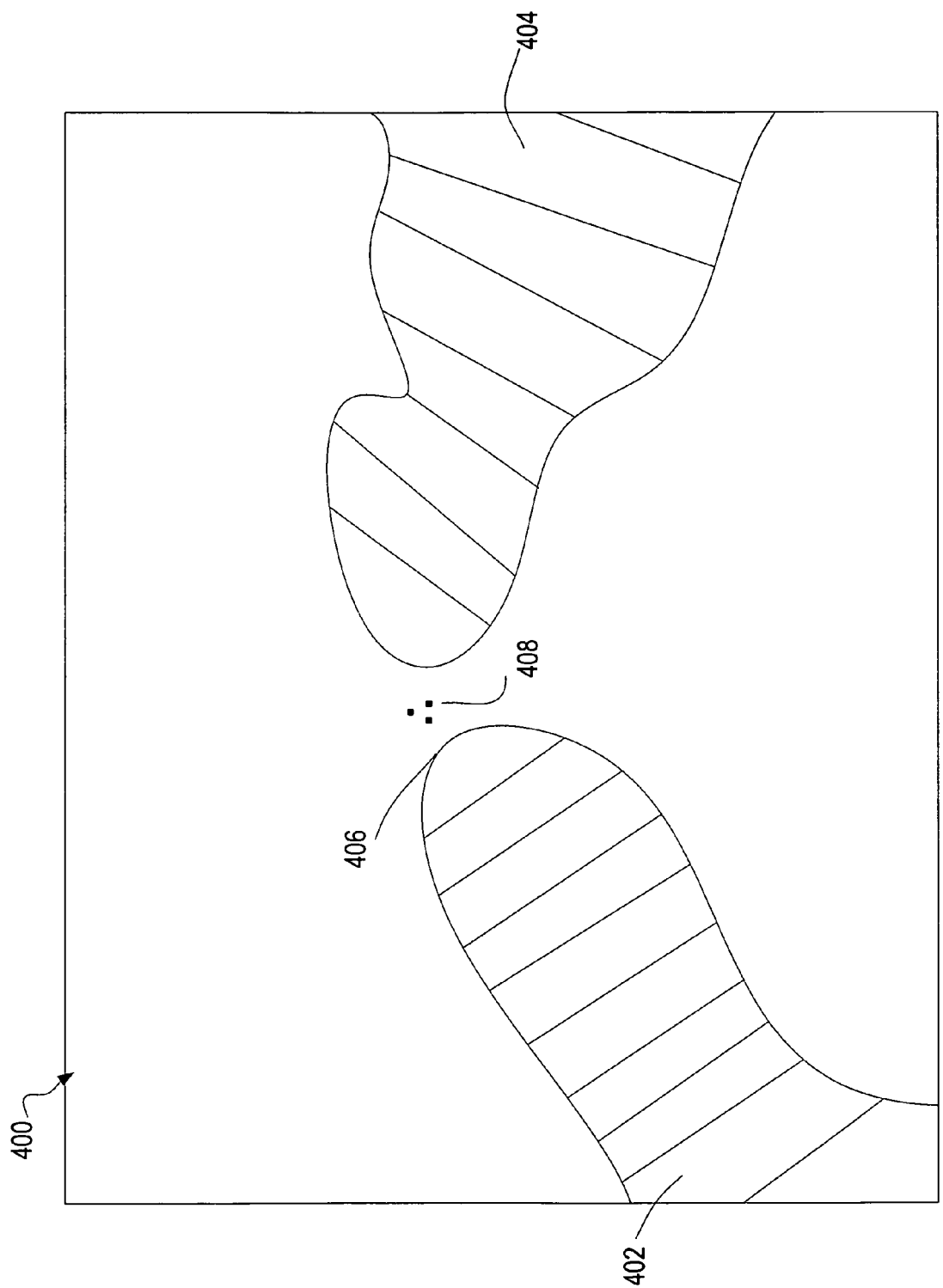
FIG. 8 is a two-dimensional diagram for one implementation of the system of FIG. 1 that illustrates a simplified version of the decision boundaries of the neural network for certain characters without any user-specified samples.
Figure 9:
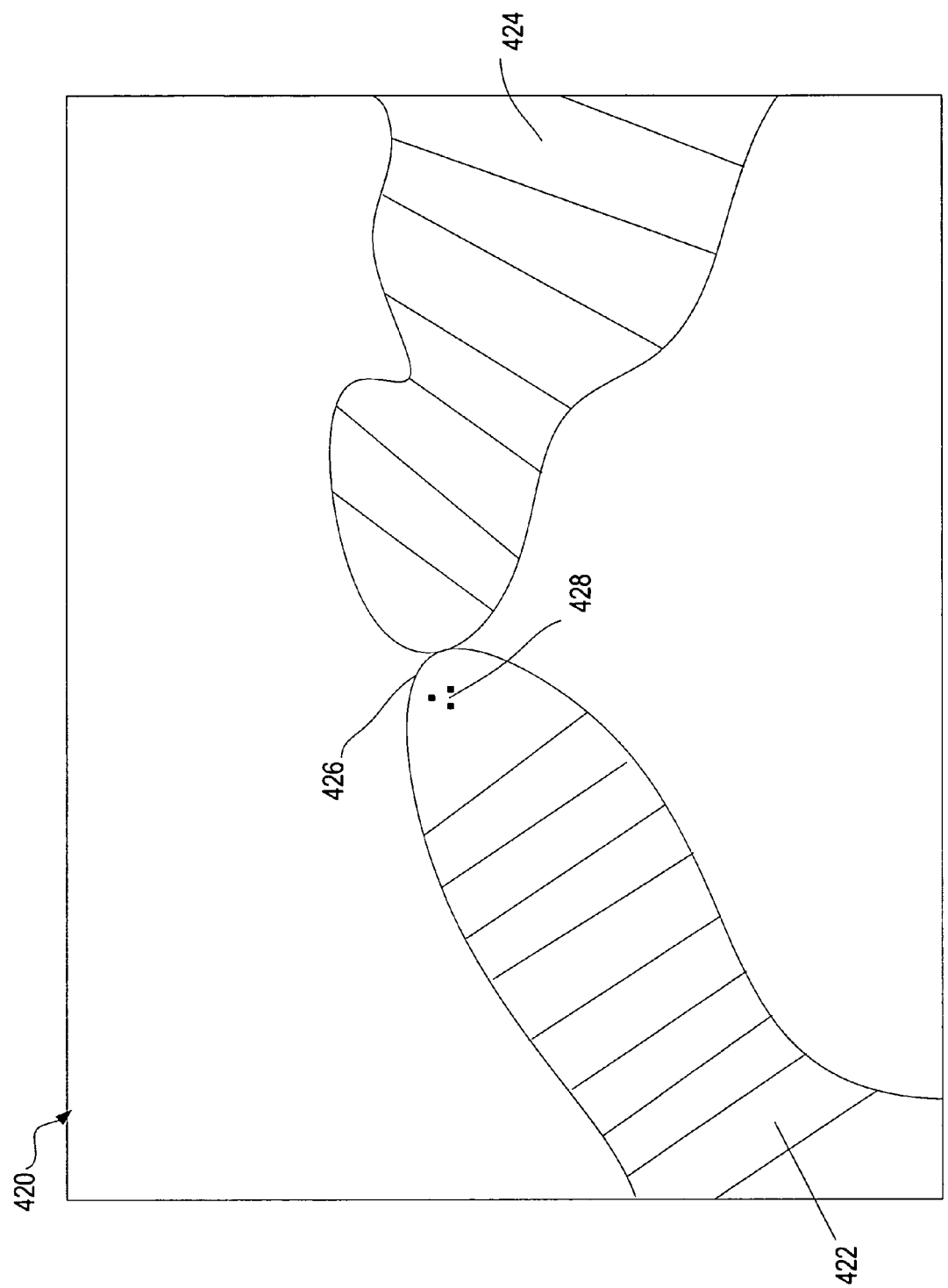
FIG. 9 is a two-dimensional diagram for one implementation of the system of FIG. 1 that illustrates a simplified version of the decision boundaries of the neural network for certain characters being adjusted based upon user-specified samples.

FIG. 8 shows a two-dimensional diagram 400 for one implementation to graphically illustrate the concept of adapting decision boundaries (in a simplified form) of the neural network for certain characters without any user-specified samples. The decision boundaries 406 for character "A" 402 are illustrated. The decision boundaries for character "B" 404 are also illustrated. Anything outside these two boundaries belongs to character "C". Suppose the user supplies samples for character "A" which fall into area 408 outside the current boundary for character "A". As shown in FIG. 9, the decision boundaries 426 of the neural network are adjusted for certain characters (e.g. in this case the boundaries 426 for character "A") based upon the user-specified samples. The decision boundaries for characters "B" 424 and "C" remained largely intact since no user-supplied samples were given for it. In one implementation, specially chosen writer-independent character samples (FIG. 3) are combined with the user-supplied samples (e.g. both are used).

Figure 10:
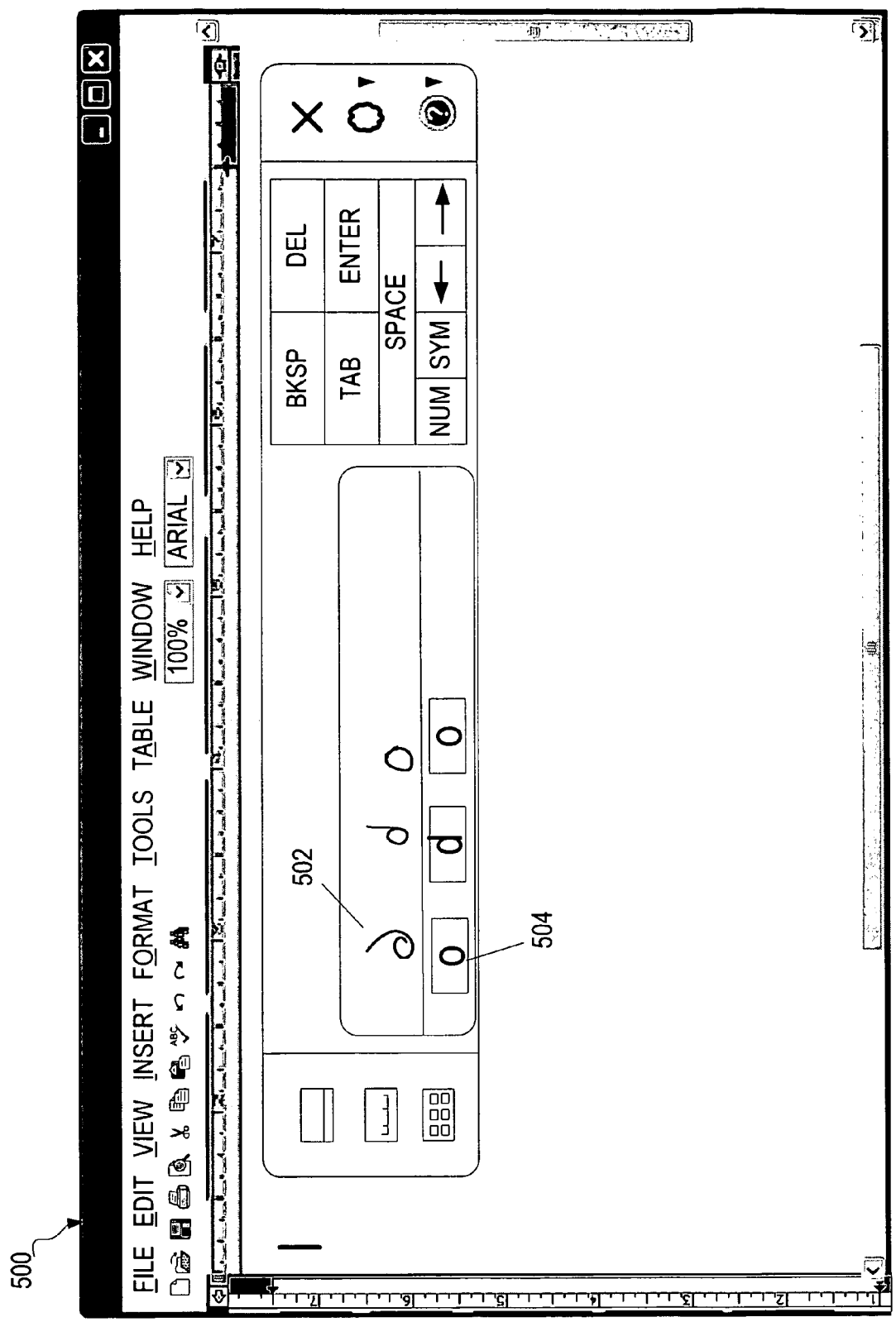
FIG. 10 is a simulated screen for one implementation of the system of FIG. 1 that illustrates a recognition operation resulting in an incorrect decision prior to a user supplying a character sample to help with corrections.
Figure 11:
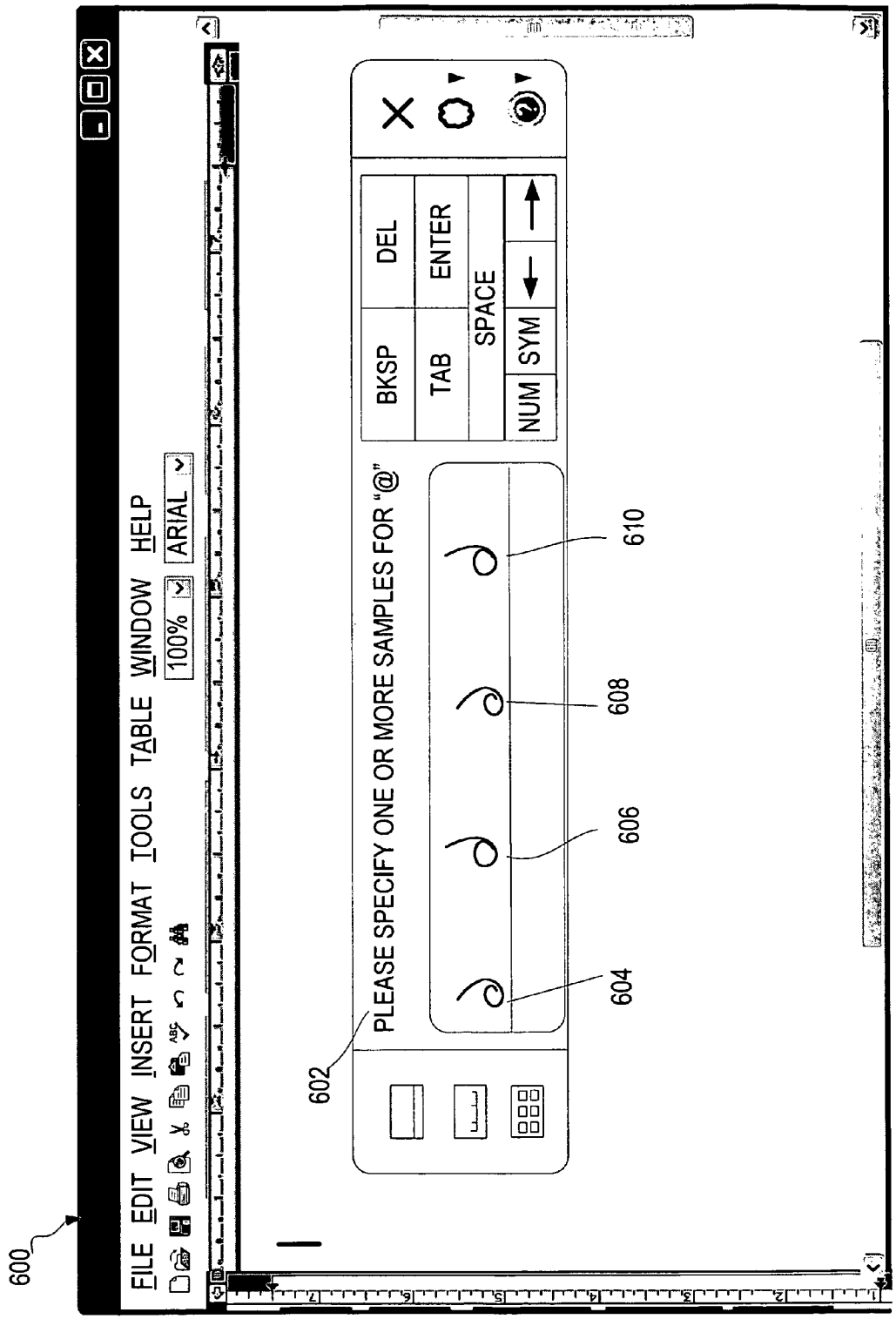
FIG. 11 is a simulated screen for one implementation of the system of FIG. 1 that illustrates allowing the user to input one or more samples for a particular character.

In another implementation instead of using actual samples, generative cluster models for each character are used to generate samples of characters not supplied by the user. In another implementation, the user-supplied samples for the particular samples are the only ones kept for the particular character (e.g. the writer-independent neural network samples are discarded), and other methods employed to maintain the decision boundaries for non-user supplied characters. In yet another implementation, the neural network parameters can be decayed towards the writer independent parameter values. In either event, the decision boundaries of the neural network for that character are adjusted accordingly for the particular character for which the user supplied samples, while the decision boundaries for non-user supplied characters are left intact FIG. 10 shows a simulated screen 500 of one implementation that appears when a recognition operation results in an incorrect decision prior to a user supplying a character sample to help with corrections. The user enters a "@" sign 502 in his/her handwriting (with his/her own unique style), and the system recognizes the character as a lower case "o" 504. Turning to FIG. 11, a simulated screen 600 of one implementation is shown that appears when the user supplies input for one or more samples for a particular character in his/her own handwriting. The user is prompted to enter one or more samples for the "@" character 602, since the user has indicated he/she wishes to further train the writer-independent neural network to his/her particular style for that character (e.g. the user is not satisfied with the recognizer's normal results for that character—such as the incorrect result shown in FIG. 10). The user then specifies one or more samples for "@", such as the four samples shown (604, 606, 608, and 610, respectively).

Figure 12:
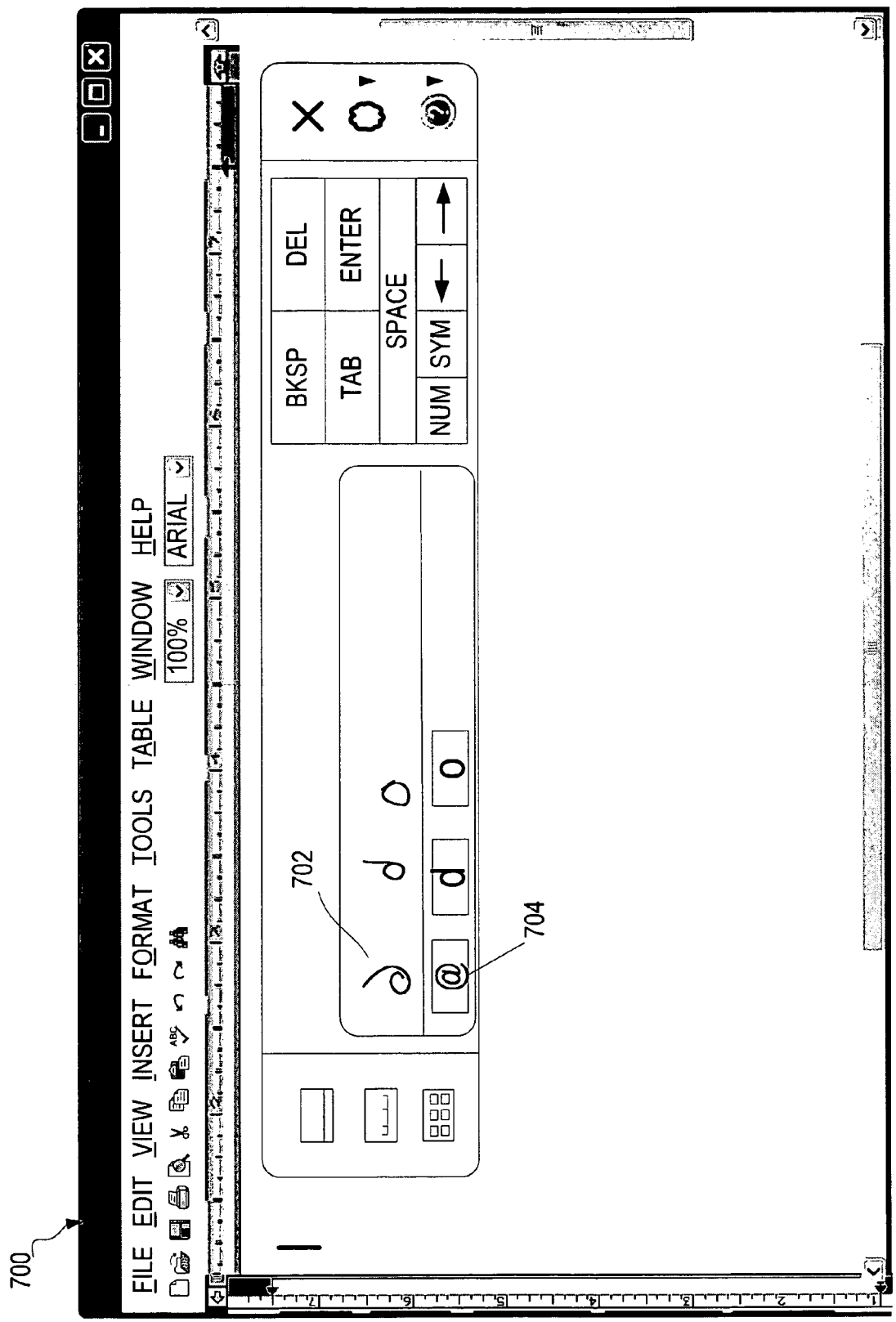
FIG. 12 is a simulated screen for one implementation of the system of FIG. 1 that illustrates a recognition operation resulting in a correct decision after the user supplied one or more character samples to help with corrections.

FIG. 12 shows a simulated screen 700 of one implementation that appears when a recognition operation results in a correct decision after the user-supplied one or more character samples to help with corrections. In the example shown, the user enters a "@" character in his own personal style, and the system this time accurately recognizes the character as a "@" character 704 based on the user-supplied samples given earlier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for adjusting a writer-independent neural network based on user-supplied samples comprising the steps of:
   receiving handwritten input from a user;
   performing a recognition operation on the handwritten input;
   displaying a recognition result to the user;
   receiving a selection from the user to train a neural network on at least one certain character because the user was not satisfied with the recognition result;
   prompting the user to supply one or more samples for the at least one certain character;
   removing an effect of any writer-independent character samples on the neural network for the at least one certain character leaving only the one or more samples of the at least one certain character supplied by the user; and adjusting the neural network for the at least one certain character.

2. The method of claim 1, further comprising:

using the adjusted neural network for performing a later recognition operation.

3. The method of claim 2, wherein the later recognition operation involves the user inputting the at least one certain character, and wherein a correct result is returned by a recognizer based on a fact that the user previously trained the neural network on the at least one certain character.

4. The method of claim 2, further comprising:

displaying a result of the later recognition operation to the user on a display device.

5. The method of claim 1, wherein the neural network is adjusted for the at least one certain character by adjusting at least one decision boundary for the at least one certain character based on the one or more samples supplied by the user.

6. The method of claim 1, wherein at least one decision boundary for the at least one certain character is adjusted after the one or more samples supplied by the user are added to the neural network.

7. The method of claim 1, wherein the at least one certain character is selected from a group consisting of a single character, multiple characters, a word, and a phrase.

8. The method of claim 1, wherein at least one decision boundary for the at least one certain character is adjusted after adjusting at least one parameter of the neural network in response to the one or more samples supplied by the user.

9. A computer-readable medium having computer-executable instructions for causing a computer to perform the steps recited in claim 1.

10. The method of claim 1, further comprising:

selecting a particular character;

extracting well recognized instances of the particular character from a database;

forming a plurality of clusters based on the extracted well recognized instances of the particular character; and saving a small number of samples from each of the plurality of clusters in proportion to a frequency of the respective clusters in a general population.

11. A computer-readable medium having computer-executable instructions for causing a computer to perform steps comprising:

receive a selection from a user to train a writer-independent neural network on a certain character for which the user is not satisfied with a recognition result from a recognizer;

prompt the user to specify one or more samples for the certain character;

remove an effect of any writer-independent character samples on the neural network for the certain character leaving only the one or more samples of the certain character supplied by the user;

adjust the neural network based upon the one or more samples supplied by the user for the certain character;

receive handwritten input from the user; and perform a recognition operation on the handwritten input using the adjusted neural network.

12. The computer-readable medium of claim 11, further having computer-executable instructions for causing a computer to perform the step comprising:

display a result of the recognition operation on a display device.

13. The computer-readable medium of claim 11, further having computer-executable instructions for causing a computer to perform the step comprising:

leave decision boundaries of the neural network intact for one or more other characters for which the user did not supply one or more samples.

14. A method for improving handwriting recognition results for user-supplied samples comprising the steps of:

removing an effect of nonuser-supplied character samples on a neural network for a certain character leaving only one or more samples provided by a user for the certain character;

adjusting the neural network for the certain character with the one or more samples provided by the user for the certain character;

receiving handwritten input from the user; and performing a recognition operation on the handwritten input using the neural network that was adjusted for the certain character.

15. The method of claim 14, further comprising:

displaying a result of the recognition operation to the user on a display device.

16. The method of claim 14, wherein the neural network is adjusted for the certain character by adjusting at least one decision boundary associated with the certain character in the neural network.

17. The method of claim 14, wherein the adjusting is performed by adjusting at least one parameter associated with the neural network to take into account the one or more samples provided by the user.

18. A computer-readable medium having computer-executable instructions for causing a computer to perform the steps recited in claim 14.

19. The method of claim 14, further comprising:

supplementing a set of nonuser-supplied character samples, which were used to adapt the neural network for characters other than the certain character, with other nonuser-supplied samples from a pool of characters.

* * * * *

UNITED STATES PATENT AND TRADEMARK OFFICE
CERTIFICATE OF CORRECTION

| | | |
|---|---|---|
| PATENT NO. | : 7,702,145 B2 | Page 1 of 1 |
| APPLICATION NO. | : 11/477332 | |
| DATED | : April 20, 2010 | |
| INVENTOR(S) | : Michael Revow et al. | |

It is certified that error appears in the above-identified patent and that said Letters Patent is hereby corrected as shown below:

In Cover page, item (75), under "Inventors" column 1, line 2, delete "Goval" and insert -- Goyal --, therefor.

In column 1, line 7, before "devices" insert -- on --.

Signed and Sealed this

Fifteenth Day of February, 2011

David J. Kappos
*Director of the United States Patent and Trademark Office*